United States Patent [19]

Prucha et al.

[11] 4,192,967
[45] Mar. 11, 1980

[54] TELETYPE MIXER APPARATUS FOR CODING AND DECODING

[75] Inventors: Martin J. Prucha, Mountain View, Calif.; Willis L. Donaldson; Douglas N. Travers, both of San Antonio, Tex.

[73] Assignee: The United States of America as represented by the Secretary of the Air Force, Washington, D.C.

[21] Appl. No.: 554,286

[22] Filed: May 26, 1966

[51] Int. Cl.² .............................................. H04L 9/02
[52] U.S. Cl. .................................................. 178/22
[58] Field of Search .......................................... 178/22

[56] References Cited

U.S. PATENT DOCUMENTS

| 2,401,855 | 6/1946 | Briggs et al. | 178/22 |
| 2,872,514 | 2/1959 | Negri | 178/22 |
| 3,229,037 | 1/1966 | Stürzinger et al. | 178/22 |
| 3,291,908 | 12/1966 | Ehrat | 178/22 |

*Primary Examiner*—Howard A. Birmiel
*Attorney, Agent, or Firm*—Joseph E. Rusz; George Fine

[57] ABSTRACT

Apparatus for terminating teletype signal lines and mixing cryptographic teletype signals to furnish an enciphered teletype signal including a secondary operating mode of the mixer unit to retransmit the incoming teletype signal in the event enciphering or deciphering is not required.

4 Claims, 5 Drawing Figures

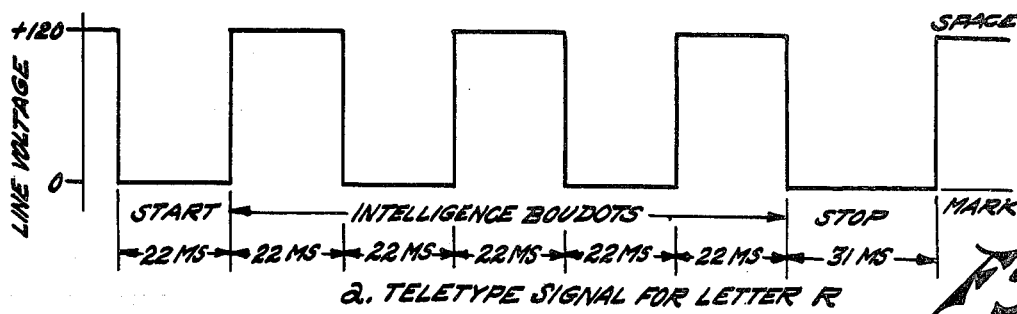
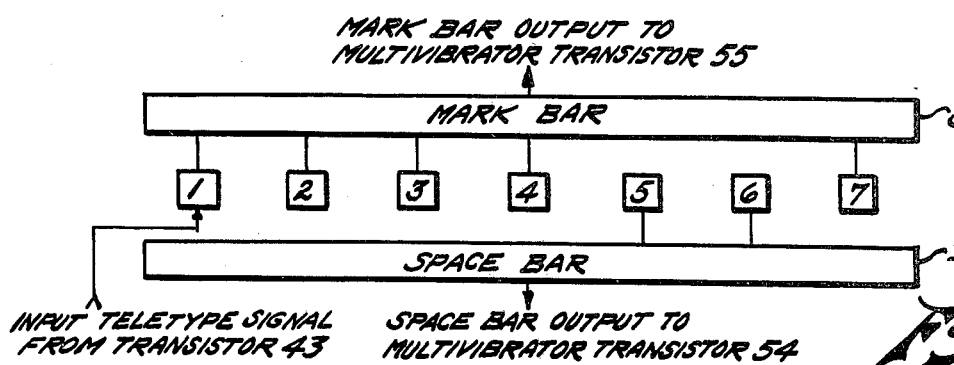
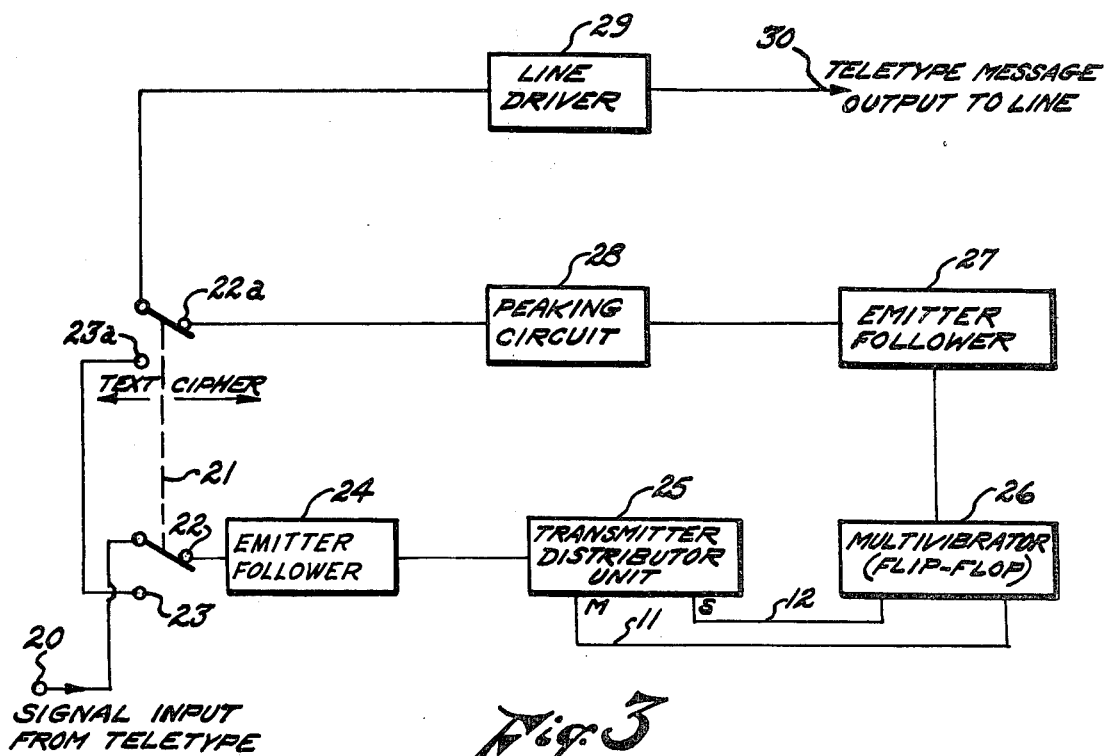

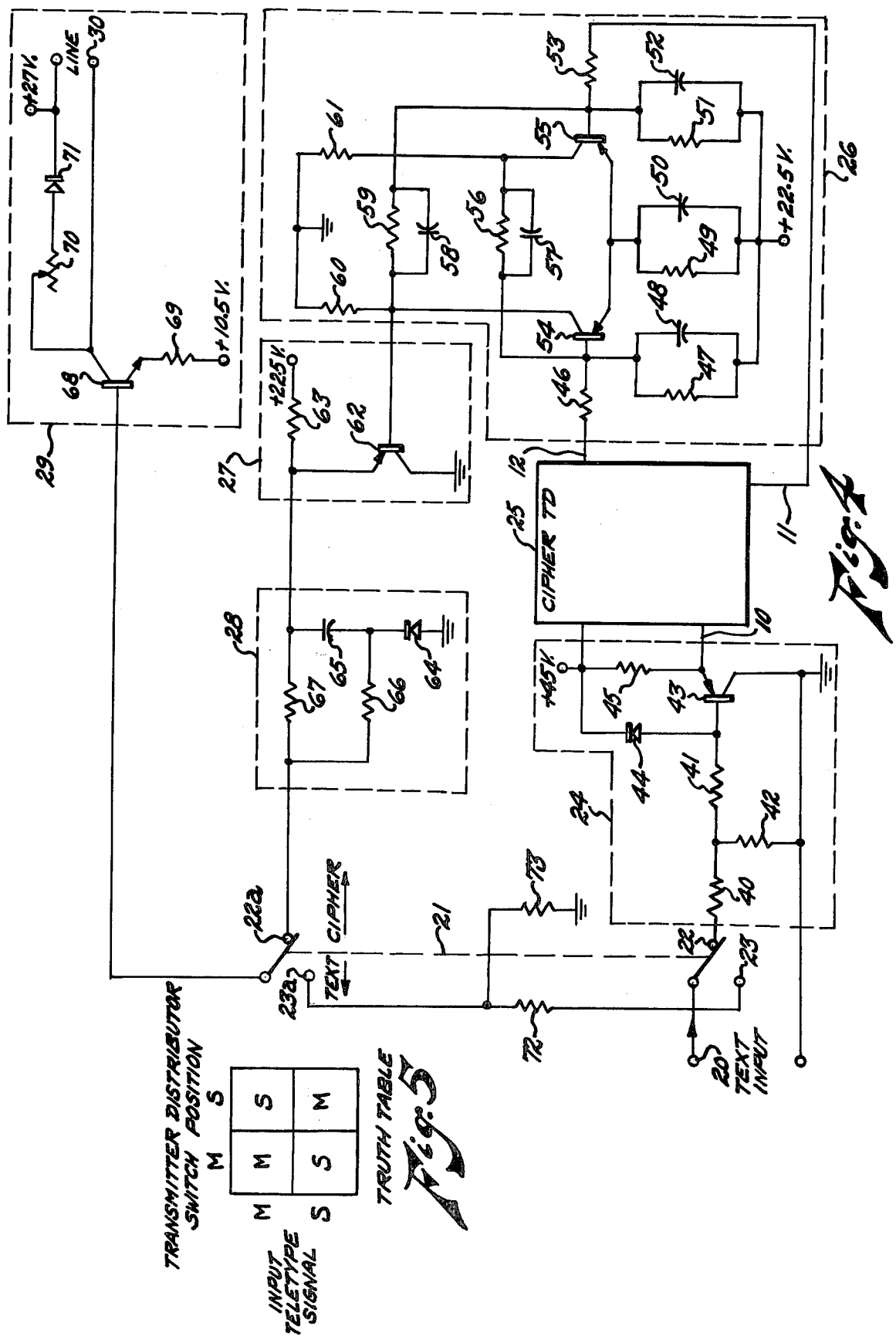

TELETYPE MIXER APPARATUS FOR CODING AND DECODING

This invention relates to coding-decoding apparatus for use in a teletype communication system and more particularly teletype mixer apparatus to furnish an enciphered or deciphered teletype signal with a secondary operating mode of retransmitting the incoming teletype signal in the event enciphering or deciphering is not required.

In the prior art, the teletype mixer included relays which introduced limitations. One of the limitations was electromagnetic radiation. Further limitations introduced by relays were the moving parts and multiplicity of contacts. The present invention eliminates many of these limitations.

The primary function of the mixer unit of the present invention when operated with a teletype transmitter installation is to cipher the transmitter signal by combining the standard teletype signals from the transmitter with random-type signals obtained from a precut cipher tape, using a transmitter distributor unit to perform the mixing operation. The mixed signal from the transmitter-distributor unit which has been altered in form from the desired teletype signal as a result of the mixing operation, is then reshaped to the desired form and delivered to the output line terminals for transmission.

For direct transmission without ciphering, means are provided which permits the transmitter signal to be relayed to the line terminals bypassing the transmitter-distributor unit and the signal reshaping circuit in the teletype mixer unit.

In accordance with the present invention the teletype mixer unit is a device for terminating teletype signal lines and mixing cryptographic teletype signals to furnish an enciphered or deciphered teletype signal. A secondary operating mode of the mixer unit is to retransmit the incoming teletype signal in the event enciphering or deciphering is not required. When enciphering or deciphering is to be performed on an incoming teletype signal, a text-cipher switch is placed in the cipher position. When ciphering or deciphering is not required, the switch is in a text position, thereby bypassing the ciphering-deciphering mode of operation.

An object of the present invention is to provide apparatus for mixing teletype signals to furnish an enciphered or deciphered teletype signal.

Another object of the present invention is to provide apparatus for enciphering or deciphering teletype signals which further includes bypassing the teletype signal when ciphering is unnecessary.

The various features of novelty which characterize this invention are pointed out with particularity in the claims annexed to and forming part of the specification. For a better understanding of the invention, however, its advantages and objects obtained with its use, reference should be had to the accompanying drawings and descriptive matter in which is illustrated a preferred embodiment of the invention.

FIG. 1 shows a time diagram of a teletype signal with marks and spaces indicated;

FIG. 2 shows a simplified transmitter-distributor unit included in the preferred embodiment of the present invention;

FIG. 3 shows a block diagram of the preferred embodiment of the present invention;

FIG. 4 shows the circuit diagram of FIG. 3 partly in schematic and partly in block form; and FIG. 5 shows a truth table utilized with the preferred embodiment.

The standard type teletype signal consists of a five unit start-stop code. The start pulse and the five code impulses are each 22 milliseconds long. The stop impulse is 31 milliseconds in duration. Between each start and stop pulse is transmitted a five unit code which represents a single character. To follow the mixing function of the teletype mixer unit in a simplified manner, the teletype signals will be defined as follows: when a pulse is present at the input such as the start, stop, or a symbol in one space of the five unit character, it is designated a mark (M); in the absence of a pulse, it is referred to as a space (S). FIG. 1 shows a time diagram for the letter R of a teletype signal with marks and spaces indicated.

The enciphering process in the teletype mixer unit of the present invention, which also includes the transmitter-distributor unit, mixes the combination of pulses between the start and stop pulse in a preselected random manner to insure a secure transmitted message to the proper personnel. The deciphering process utilizes the identical preselected random code to restore the message to its original form.

FIG. 2 shows a simplified transmitter-distributor unit diagram. This unit includes a seven position switch which may be motor driven. Connections between switch positions 1-7 and bars 8 and 9 are programmed with a paper tape. This type of tape controlled rotary driven switch is conventional such as shown and described in Department of the Army Technical Manual TM-2222 published May 1951 and entitled *Receiving Transmitter Distributors and Transmitter Distributors*. Each position of the switch is programmed by a paper tape system to correspond to either a space (S) or a mark (M). Before the start signal arrives, the motor which drives the switch is in a waiting mode. Upon arrival of the start signal, the motor engages the switch and drives it through the seven positions and returns to a waiting condition. The seven positions of the switch are driven in synchronism with the incoming teletype code. That is, the first switch position 1 which is the start position corresponds to the start pulse, second switch position 2 corresponds to the first space in the teletype character, and so forth. The seventh switch position 7 corresponds to the stop pulse. Mark bar 8 and space bar 9 are shown with output lines 11 and 12, respectively. Input line 10 receives an input teletype signal.

Now referring to FIG. 3 which is a block diagram of the preferred embodiment of this invention. There is shown test-cipher switch 21 in cipher position 22, 22a. A signal input from teletype is received at terminal 20 for application to attenuator-emitter follower 24 and then by way of line 10 to cipher transmitter-distributor unit 25 which as described heretofore serves as an encoding switch. The input signal may be represented as either a space or a mark. The position of transmitter-distributor unit encoding switch 25 is in either the space or marks position. The actual position is determined by the encoding tape. The teletype signal is then routed through transmitter-distributor switch 25 to bistable multivibrator 26 by way of lines 11 and 12. The bistable output is determined by the combination of marks (M) and spaces (S) of the cipher transmitter-distributor encoder and the teletype signal. A truth table as illustrated in FIG. 5 is used to determine the output of the multivibrator for any combination of inputs.

As an example of the truth table use, consider that both the transmitter-distributor encoder and the teletype input are marks. The output is then read as the intersection of a horizontal and vertical line through the mark (M) positions and this is seen to yield a mark. The mark (M) or space (S) output of multivibrator 26 is then sent to emitter follower 27 then to peaking circuit 28 and on to line driver 29 to output terminal 30. As the start and stop pulses are both marks, cipher transmitter-distributor unit 25 of FIG. 3 is programmed for a mark in switch positions 1 and 7 (of FIG. 2), thereby providing proper start and stop pulses in the output. The remaining five switch positions (of FIG. 2) are programmed in a prescribed manner and the output may then be determined by the truth table for each of the five, 22 millisecond periods between the start and stop pulse.

For direct transmission without ciphering, text cipher switch is thrown to position 23, 23a thus permitting the transmitter teletype signal to be relayed to the line terminals by way of line driver 29 bypassing transmitter-distributor unit 25 and the remaining signal reshaping units.

Now referring to FIG. 4, showing FIG. 3 in schematic form except for transmitter-distributor unit 25 which is shown in block form, incoming teletype signal is received at terminal 20. During operation, the input at terminal 20 from teletype transmitter equipment is continuous direct current. This current is interrupted (dropped to zero) by the transmitter at the start of each teletype character signal sequence, and is interrupted or not during the sequence according to the particular character being transmitted. With Text-Cipher switch 21 in position 22, 22a, the teletype signal is passed to an attenuator comprised of resistors 40, 41, and 42 and then on to transistor 43 which performs two functions. First, when the input signal drops to zero with the start pulse, it provides the current necessary to operate the transmitter-distributor unit 25. Secondly, following the start pulse, it provides the necessary positive or negative potential relative to the space (S) or mark (M) contacts, as determined by the presence or absence of the +120 volts during the input signal.

Transistor 43 is operated as an emitter follower to provide the current during the starting pulse. The aforementioned attenuator comprised of resistors 40, 41, and 42 attenuate the input signal and provide proper bias for the base of transistor 43. Diode 44 limits the positive potential applied to the transistor base, thereby permitting the design of the attenuator and biasing network for operation with input voltages less than 120 volts.

The signal from transistor 43 by way of line 10 to transmitter-distributor unit 25 and the mark (M) signal is fed to multivibrator 26 by way of line 11 and the space (S) signal by way of line 12. Multivibrator 26 is comprised of transistors 54 and 55. The output signal is taken from the collector of transistor 54 and is then applied to transistor 62 which is operated as an emitter follower to provide sufficient current to switch the line output switch transistor 68, without loading the multivibrator circuit.

The network between transistors 62 and 68, consisting of resistors 66, 67, capacitor 65, and diode 64 is included to give a small amount of peaking to the signal. This is done to increase the rise time of the line signal current changes to compensate for the inductance of the load on transistor 68.

With Text Cipher switch 21 in the text position, that is with connection made to terminals 23, 23a, the incoming teletype signal is connected through a voltage divider resistor network 72, 73 to the line output transistor 68. The voltage divider which consists of a 1000 ohm (resistor 72) and 1500 (resistor 73) resistors, serves two purposes. With the signal input at +120 volts the 1000 ohm resistor limits the base current input to transistor 68 to a safe value to avoid damage to this transistor, and with the signal input at zero volts as occurs during the start pulse, the 1500 ohm resistor ties the base of transistor 68 to the common ground potential.

Transistor 68 is a common emitter connected, power switching transistor (such as a 2N142) which amplifies the attenuated text input signal and delivers it to the output signal line. The signal line impedance including the termination at the far end forms the collector load impedance for transistor 68. Variable resistor 70 and diode 71 are included to prevent damage to transistor 68 from the inductive switching transients from the load.

What we claim is:

1. In a teletype communication system, apparatus to cipher input teletype signals prior to their transmission wherein the input teletype signal represents a single character by a predetermined multiple unit pulse code inserted between an associated start and stop pulse of preselected widths comprising first switch means receiving said input teletype signals, said first switch means having two positions, and first being a cipher position and the second a text position, with said first switch means in said first position, a resistive attenuator interconnecting a first emitter follower transistor with said first switch means, said resistive attenuator also providing bias to said first emitter follower transistor, enciphering means having a single input and a first and second output, with said input being connected to the output of said first emitter follower transistor, said means mixing in a preselected random manner said predetermined multiple unit pulse code while retaining their associated start and stop pulse in their original position, a bistable multivibrator having first and second inputs and a single output, said first and second inputs being connected to said first and second outputs, respectively, of said enciphering means, a peaking circuit interconnecting said output of said bistable multivibrator with a second emitter follower transistor, and a common emitter connected transistor operating as a driver and receiving the output signal from said peaking circuit for delivery to an output terminal for further transmission.

2. In a teletype communication system as described in claim 1 with said first switch means being in said second position, said input teletype signal being directly connected to the input of said common connected transistor for delivery to said output terminal for further transmission purposes.

3. In a teletype communication system as described in claim 1 wherein said peaking circuit consists of a first resistor interconnecting said output of said second emitter follower transistor and the input of said common emitter connected transistor, a series combination of a capacitor and a diode connected from said output of said second emitter follower to ground, and a third resistor connected from said input of said common emitter connected transistor to said diode.

4. In a teletype communication system as described in claim 1 means to minimize inductive switching transients through said common emitter connected transistor consisting of a series arrangement of a variable resistor and a diode connected between the output of said common emitter connected resistor and said output terminal.

* * * * *